United States Patent [19]
McBurney et al.

[11] Patent Number: 6,078,290
[45] Date of Patent: Jun. 20, 2000

[54] USER-CONTROLLED GPS RECEIVER

[75] Inventors: Paul W. McBurney, San Francisco; Arthur N. Woo, Cupertino, both of Calif.

[73] Assignee: Trimble Navigation Limited, Sunnyvale, Calif.

[21] Appl. No.: 09/003,538

[22] Filed: Jan. 6, 1998

[51] Int. Cl.[7] .............................. G01S 5/02; H04B 7/185
[52] U.S. Cl. ................ 342/417; 342/357.01; 342/357.06
[58] Field of Search ...................................... 342/357, 457, 342/417, 367; 701/213

[56] References Cited

U.S. PATENT DOCUMENTS

| | | | |
|---|---|---|---|
| 4,894,662 | 1/1990 | Couselman | 342/357 |
| 5,148,452 | 9/1992 | Kennedy et al. | 375/96 |
| 5,345,244 | 9/1994 | Gildea et al. . | |
| 5,390,207 | 2/1995 | Fenton et al. | 375/1 |
| 5,650,785 | 7/1997 | Rodal | 342/357 |
| 5,663,733 | 9/1997 | Lennen | 342/357 |
| 5,703,597 | 12/1997 | Yu et al. | 342/357 |
| 5,874,914 | 2/1999 | Krasner | 342/357 |

*Primary Examiner*—Thomas H. Tarcza
*Assistant Examiner*—Dao L. Phan
*Attorney, Agent, or Firm*—Blakely, Sokoloff, Taylor & Zafman LLP

[57] ABSTRACT

A system and method which enables a user platform to perform low level control of a channel unit which performs acquisition and tracking of Global Positioning System (GPS) signals processing the measurement platform which includes the channel and that performs all satellite tracking functions which are driven by interrupts. Intermediate measurements data generated therefrom, for example code phase, carrier phase and Doppler, are communicated to a user platform which computes receiver position and time. As a result, the user platform can easily be configured to perform user-specific processes without incurring conflicts with the interrupt driven processes occurring on the measurement platform. Furthermore, the user platform is configured to issue commands to the channel unit to control the operation of the measurement platform. Thus, the performance of the measurement platform can be tailored specifically to the end user application.

30 Claims, 10 Drawing Sheets

| PREPOSITIONING COMMAND ||
|---|---|
| FIELD | DESCRIPTION |
| CHANNEL ID | CHANNEL IDENTIFICATION |
| CHANGE OVER | WHEN TO CHANGE OVER TO NEW PREPOSITIONING DATA. 1=CHANGE NOW. 0=FINISH. CURRENT DWELL BEFORE CHANGING |
| DYNAMICS MODEL | ESTIMATED ACCELERATION OF RECEIVER |
| SV-ID | |
| BIT SYNC STATUS | 1=KNOWN. 0=NOT KNOWN |
| DATA APPLICABILITY | 1= USE DATA IN PACKET<br>0= USE LAST PREPOSITIONING DATA |
| PREPOSITION DATA TIME TAG | |
| NOMINAL CODEPHASE | |
| CODEPHASE UNCERTAINTY | |
| DOPPLER SEARCH WINDOW | STEP SIZE, NUMBER OF STEPS |
| BIT SYNC TIME TAG | |
| PDI | SEARCH PDI, TRACKING PDI |

FIG.7A

| OBSERVABLES AND OUTPUT RATE COMMAND ||
|---|---|
| FIELD | DESCRIPTION |
| PSEUDO-RANGE AND DOPPLER MEASUREMENT OUTPUT DATA | OUTPUT RANGE OF PSEUDO-RANGE AND DOPPLER DATA |
| CARRIER PHASE MEASUREMENT CONTROL | ON/OFF |
| CARRIER PHASE OUTPUT RATE | OUTPUT RATE OF CARRIER PHASE |

FIG.7B

| NAVIGATION DATA OUTPUT CONTROL/COMMAND ||
|---|---|
| FIELD | DESCRIPTION |
| CHANNEL ID | IDENTIFICATION OF CHANNEL |
| BUFFER SIZE CONTROL | 1 = COORDINATED<br>0 = UNCOORDINATED |
| STARTING TIME | STARTING GPS MILLISECOND |
| MINIMUM BUFFER SIZE | |
| THRESHOLD FOR NAVIGATION DATA | |
| THRESHOLD FOR CYCLE SLIP | |
| SINGLE SHOT | SINGLE SHOT NAVIGATION DATA CONTROL (MODE ON/OFF; BUFFER SIZE) |

FIG. 7C

| GPS TIME ADJUSTMENT AND TIME OUTPUT RATE COMMAND ||
|---|---|
| FIELD | DESCRIPTION |
| TIME ADJUSTMENT TYPE | 0 = REQUEST; 1 = ABSOLUTE; 2 = RELATIVE |
| ADJUST AT GPS TIME BOUNDARY | 1 = YES; 2 = NO |
| OUTPUT RATE | |
| TIME ADJUSTMENT | ADJUSTMENT VALUE |
| TIME BOUNDARY | WHEN TO APPLY COMMAND |

FIG. 7D

| SET ADDITIONAL SEARCH PARAMETERS ||
|---|---|
| FIELD | DESCRIPTION |
| MAXIMUM DOPPLER SEARCH FREQUENCY ABOUT NOMINAL | |
| COPEPHASE UNCERTAINTY AT PREPOSITION RATE | |
| MAXIMUM CODE UNCERTAINTY FOR MULTIPLE PDI SEARCH | |
| MAXIMUM TIME AT MULTIPLE PDI SEARCH | |

FIG. 7E

| SEARCH POWER THRESHOLD COMMAND ||
|---|---|
| FIELD | DESCRIPTION |
| CHANNEL ID | IDENTIFICATION OF CHANNEL |
| THRESHOLD | STRONG, WEAK OR POWER THRESHOLD VALUE/NOISE |

FIG. 7F

USER-CONTROLLED GPS RECEIVER

BACKGROUND OF THE INVENTION

1. Field of the Invention

The system and method of the present invention relates to the computation of positions and timing using positioning data received from a global positioning system (GPS).

2. Art Background

The global positioning system has become increasingly popular as a position determination or time determination mechanism for a variety of applications. Using data received from GPS satellites, a receiving device can compute the position of the receiver and the current time. In early systems, a GPS receiver included a processor executing specially coded software to perform the measurements and compute navigation solutions (e.g., receiver position and time). The navigation solutions would then be transmitted to a user's processing system which would then generate application solutions, e.g., determining distance moved since last measurement. Alternately, the GPS receiver manufacturers would customize receivers to perform processes to generate navigation solutions as well as the user application solutions.

With the ever-increasing processing power of microprocessors and the desire to reduce cost and overall power consumption, there has been the move to eliminate the processor in the receiver and have the user's processor perform the navigation solution processing and the user application solution processing. Although a single microprocessor is capable of providing sufficient processing power and one processor consumes less power than two processors, integrating such functionality is not a simple task. First, processes performed to track satellites and processes performed to search for and acquire preliminary measurements are time critical; that is, as the positioning data is received from the satellites, the tracking calculations must be performed in order to maintain a closed tracking loop. Furthermore, certain preliminary measurement solutions must be performed within a certain window in order to timely process current data.

In order to manage the time critical nature of the processes, the processor that performs the tracking and measurement solutions calculations must manage a continuous stream of interrupts, i.e., the processor is interrupt driven. For example, interrupts are generated when the data is available in the correlators of the receiver, typically every millisecond for each GPS channel. Other processing, including the user application solution processing, may therefore be delayed significantly as the high priority interrupts take precedent. Furthermore, the situation can be particularly problematic if the application solution processing requires uninterrupted periods of time. In such a situation, the time critical interrupts may not be serviced in a timely manner resulting in failure to track satellites or in unreliable data being generated.

Furthermore, due to the above constraints, the end user is typically incapable of programming the end user application without corrupting the basic GPS algorithms or data generated therefrom. Thus, the GPS manufacturer's specially trained programmers typically have to program the end user application.

In addition, the user's control of the GPS receiver and the measurement information is quite limited. Typically, the system parameters are preset and not adjustable. User optimizations based upon usage or application are not available.

SUMMARY OF THE INVENTION

The system and method of the present invention provides a cost effective and efficient technique for performing time-critical tracking and measurement calculations for processing Global Positioning System (GPS) signals without conflicting with other time critical tasks in the user's application. Furthermore, the system takes advantage of the processing power of the user system for executing non time-critical GPS processing in the user's system. In addition, low power operation is achieved using a dual component system. Finally, the dual component system enables the end user to program custom applications incorporating Global Positioning System (GPS) technology.

In one embodiment the receiver is coupled to a channel unit which receives correlation energy data for each channel output from the correlators. The output from the correlators requires time critical processing to control the tracking loops for each of the channels in order to maximize the correlation energy and to generate intermediate measurement data. In one embodiment, the intermediate measurement data includes the carrier phase, code phase and Doppler data.

The system localizes processing which is common to many GPS solutions and partitions between tracking and position/velocity/time (PVT) data to separate not only the time critical processing portion but also to generate a low power component that is capable of being used for many different types of GPS solutions and applications.

The intermediate measurement data is transmitted to a processor, such as a user's general purpose processor, that computes non time-critical processes of the navigation solution, for example, receiver position, velocity and time. The user processor therefore is easily configurable to compute user application solutions. As the navigation solution processes are non-time critical, processing conflicts with the user application are minimal. In addition, the processing power of the user's processor is taken advantage of, thereby minimizing costs, while providing a workable system that lends itself easily to user customization.

In one embodiment, the channel unit includes an interface that is capable of receiving instructions from the user processor. The instructions include instructions to perform low level control of the channel unit and to receive channel status and data. Using these instructions, the user processor can specifically tailor the functionality and performance of the channel unit.

BRIEF DESCRIPTION OF THE DRAWINGS

The objects, features and advantages of the present invention will be apparent to one skilled in the art from the following detailed description in which.

DETAILED DESCRIPTION

In the following description for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
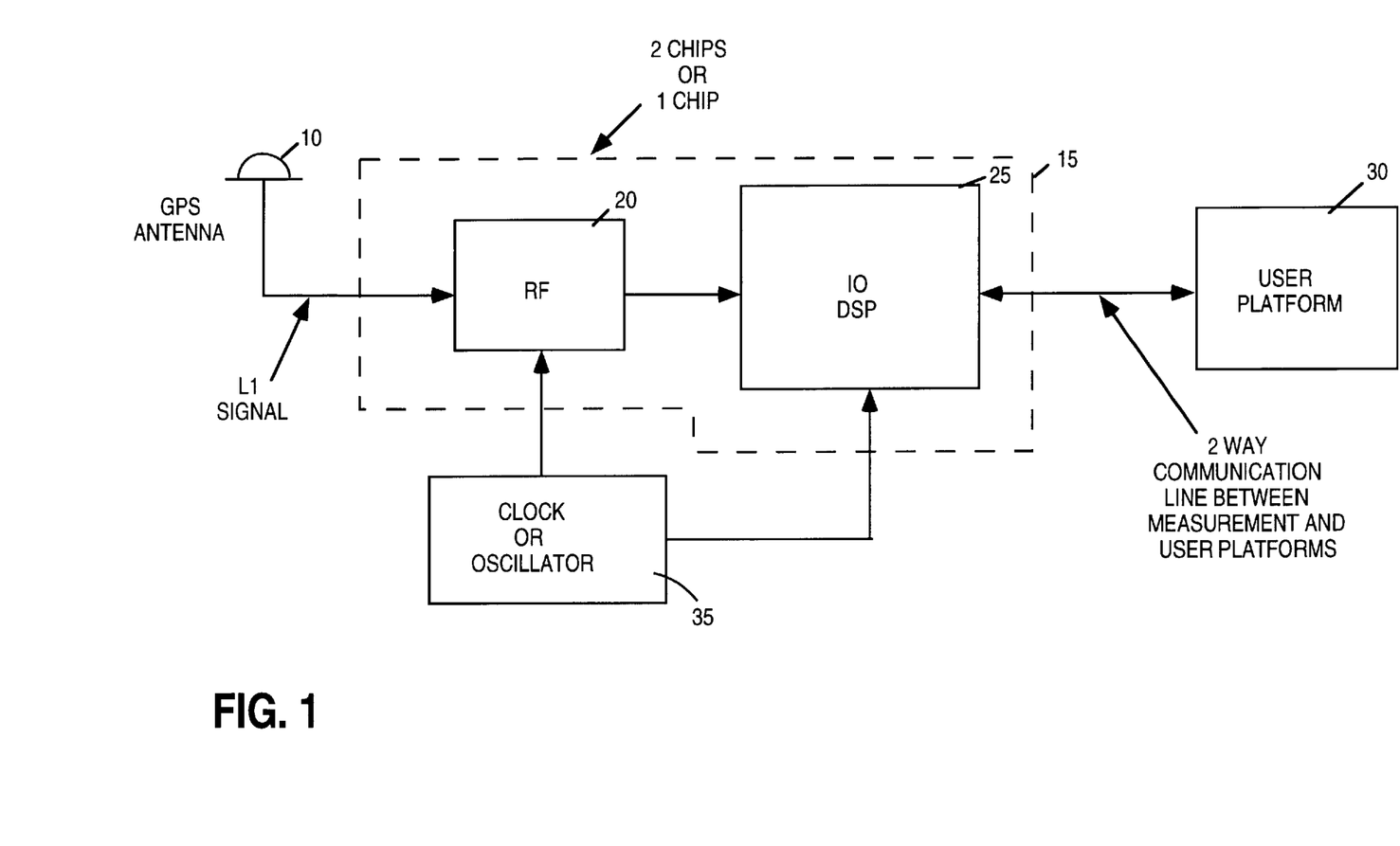
FIG. 1 is a simplified block diagram of the system of the present invention.

A simplified block diagram of one embodiment of the system of the present invention is shown in FIG. 1. The embodiment described receives positioning signals from the Global Positioning System (GPS). However, it is contemplated that the present invention can be configured to receive positioning signals from other satellite and terrestrial positioning systems, for example, satellite-based GLONASS and terrestrial-based pseudo-lite systems.

Referring to FIG. 1, the system can be divided into 2 platforms: a measurement platform 15 and a user platform 30. The measurement platform 15 receives raw positioning signals, e.g., the L1 signal, for input maintenance 10 to the RF downconverter 20 which generates the in-phase (I) and quadrature (Q) signals for each channel corresponding to a satellite the measurement platform is to lock to and track. The in-phase and quadrature signals are input to a channel unit subsystem 25 which performs the time critical calculations to enable the receiver to lock to and track each satellite in view. Intermediate measurement data generated by the channel unit subsequently is transferred to the user platform which generates the navigation solutions and also, in one embodiment, generates application specific data from the navigation solutions. Such intermediate measurement data may also include the pseudo-range to each satellite and the navigation message from each satellite being tracked. Other relevant data include Doppler offsets and carrier phase.

The advantages to such a system are quite evident. By isolating the time critical GPS processing of the measurement platform from the non-time critical processing performed on the user platform, the flexibility required by users of GPS technology is easily achieved. For example, the user platform can easily be implemented on a user's general purpose processor which is connected to the measurement platform through a standard parallel or serial connection. The processing power of the user processor can be sized to the user's application; under utilization of the processor or the need to connect an additional processor to handle some or all of the application processing is avoided. As all time critical processing is performed on the measurement platform, any user-added application processes can be executed in conjunction with the navigation solution processes without conflict. Furthermore, the navigation solutions do not have to be coded to address time critical functions which typically are a function of the hardware used; instead the navigation solutions can be coded in a general way that lends itself to porting across a variety of hardware and operating system platforms.

The system localizes processing which is common to may GPS solutions and partitions between tracking and position/ velocity/time (PVT) to separate not only the time critical processing portion but also to generate a low power platform that is capable of being used for many different types of GPS solutions and applications. As will be described below, low power operation is achieved by eliminating a large percentage of I/O drivers typically implemented in prior art GPS components. The variety of applications that can utilize the present invention is almost limitless.

Figure 2:
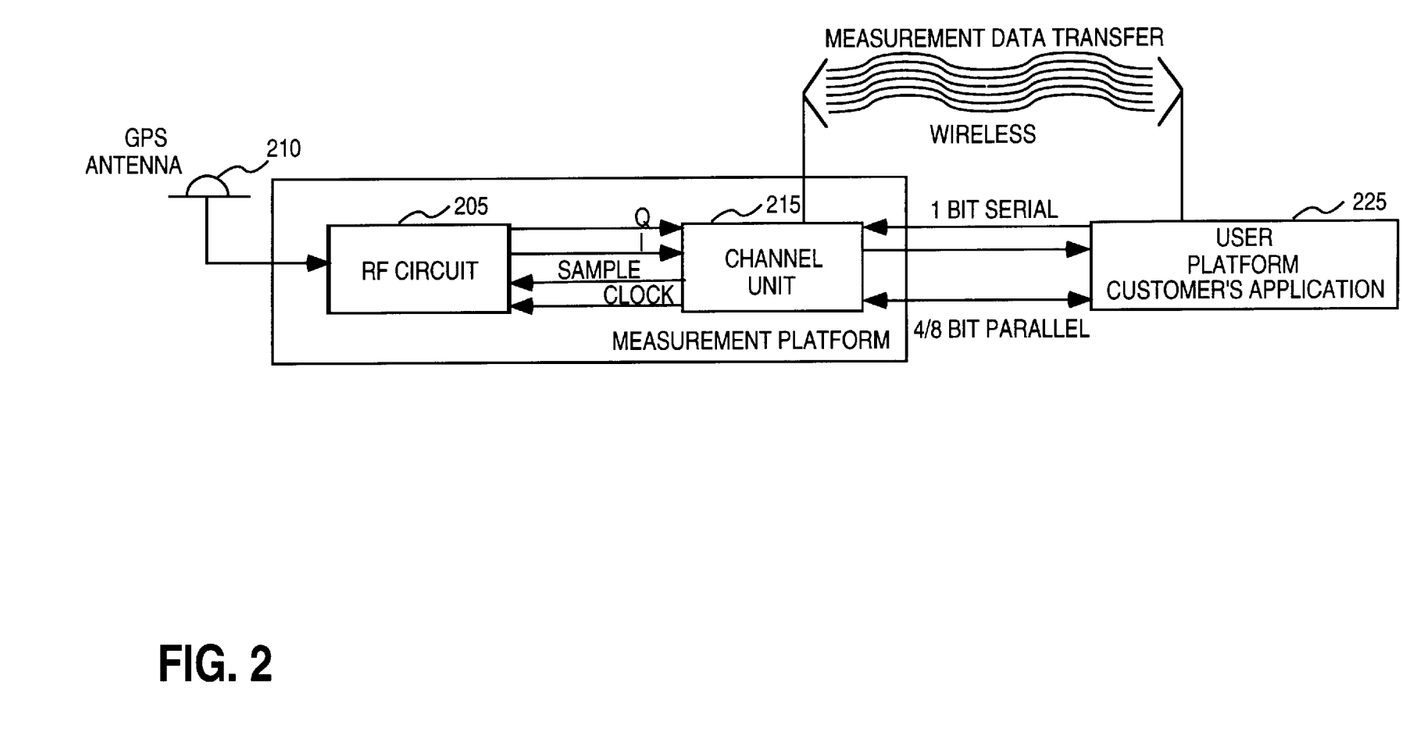
FIG. 2 is a simplified block diagram of one embodiment of the present invention showing different communication techniques between platforms.

As shown in the simplified block diagram of FIG. 2, the RF downconverter 205 receives GPS signals from the one or more satellites via the GPS antenna 210. For each satellite signal received, the I, Q and clock signals are transmitted to the channel control subsystem 215. The channel control sub-system 215 processes the signal in a timely manner and transmits the intermediate measurement data to the user platform 225. The intermediate position data can be transmitted a variety of ways as the time-critical nature of the data has been eliminated by confining the time critical processing to the measurement platform. The intermediate measurement data can be conveyed to the user platform a variety of ways, including by a serial link, parallel link or wireless communication link.

Figure 3:
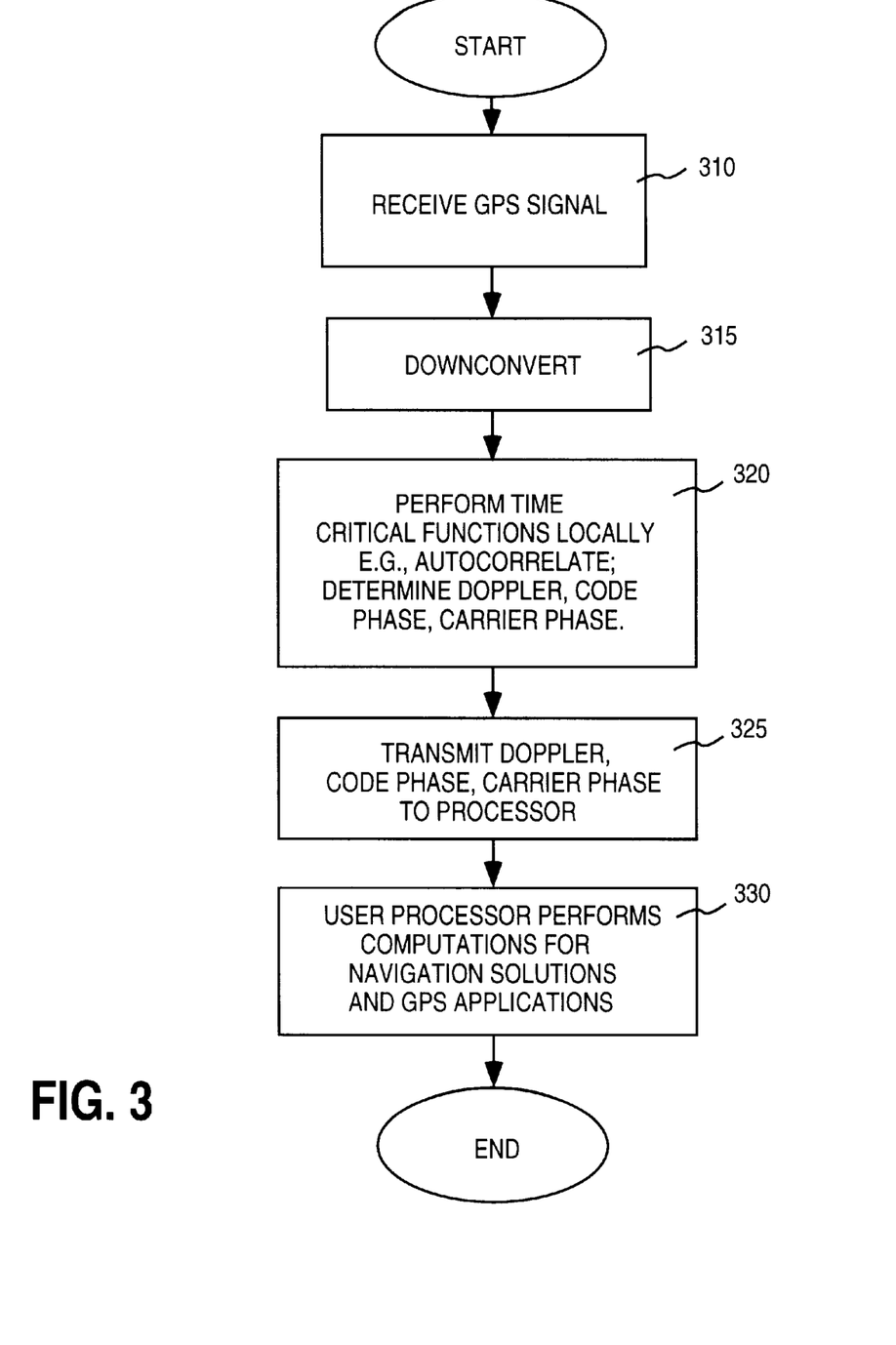
FIG. 3 is a flow chart illustrating one embodiment of the process of the present invention.

The process is generally described with reference to FIG. 3. At step 310 GPS signals are received on the measurement platform. At step 315, the signals are downconverted and processed, step 320, to perform the time critical functions required to lock and track to each satellite in view of the antenna. Intermediate measurement data is generated during this process, e.g., Doppler, code phase and carrier phase, and is transmitted to the user platform, step 325. At step 330, the user platform performs the computations necessary to generate the navigation solutions and information pursuant to user specific applications. For example, the user platform picks the satellite tracking set, calculates prepositions for satellites and sends preposition data to the channel unit, filters raw measurement data received, manages setting millisecond time, formats 50 bps Navigation data received, computes PVT and controls the measurement platform for power management purposes. In one embodiment, the measurement platform has sufficient logic to search for all satellites and preposition for satellites using only previous measurement data for observed satellites or a default search parameter set. In this situation, satellite preposition information does not need to come from the user platform.

Figure 4A:
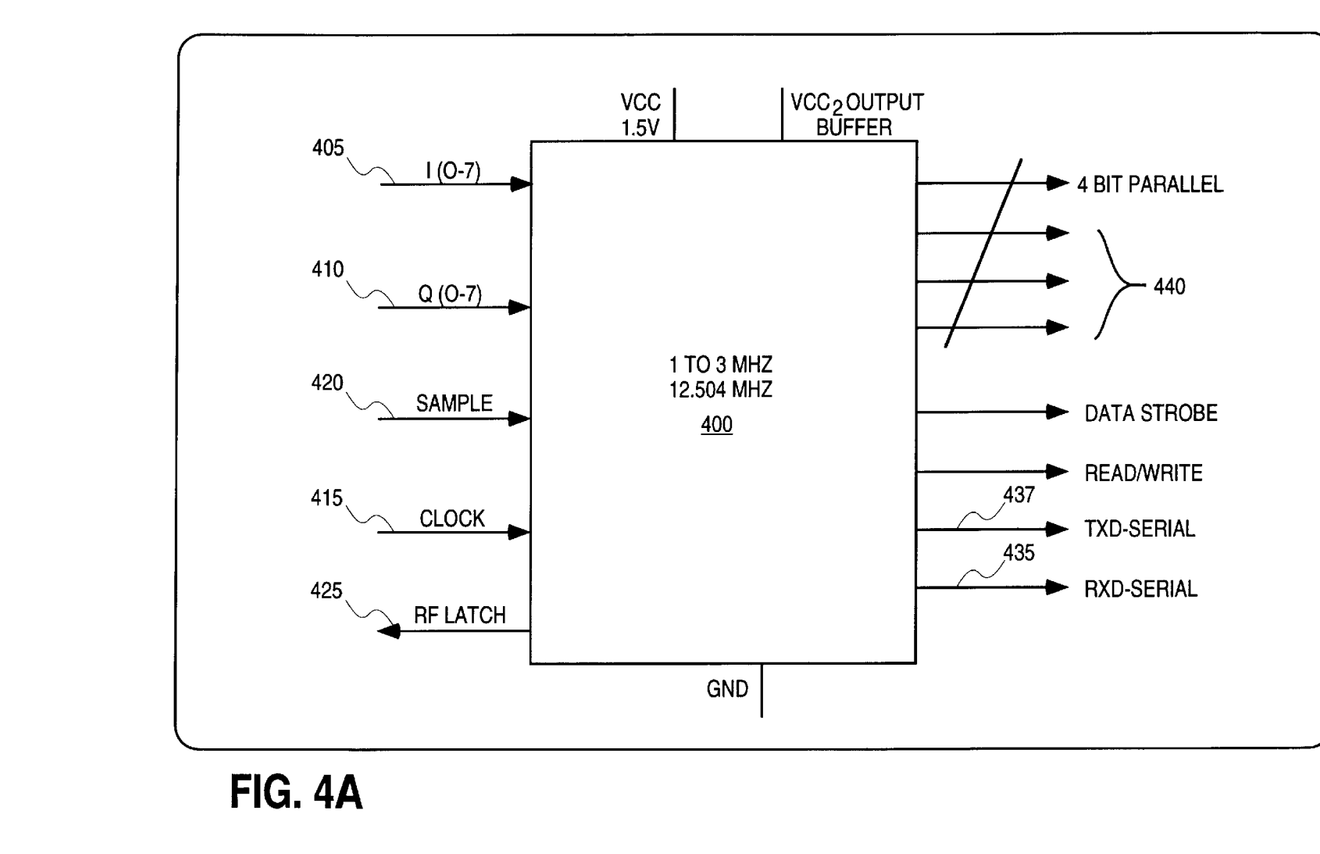
FIG. 4a is a block diagram of one embodiment of the measurement platform of the system of the present invention.

It is readily apparent that the measurement platform and the user platform can be implemented a variety of ways and the present invention is not limited to the embodiments described herein. In one embodiment of the system of the present invention, the measurement platform includes circuitry sufficient to track multiple satellites. The platform includes an RF downconverter circuit, such as the those available from Trimble Navigation Limited, connected to a channel unit sub-system, preferably implemented herein as a single-component digital signal processor specially configured to perform the functions described herein. As shown in FIG. 4a, the component 400 receives as input the in-phase 405 and quadrature 440 signals for each satellite in view (in the present illustration, up to 8 satellites, but it could be as many as 12). A clock signal 415, sample trigger 420 and a signal to control the power to the RF downconverter 425 also are coupled to the RF downconverter. The component 400 is further connected via a data port to a processor (not shown) to perform the navigation solution processing and user application processing. In the present embodiment, the component 400 is configured to selectively provide the intermediate measurement data via a serial link 435, 437, or parallel link 440. In addition, it is contemplated that the component 440 could be coupled to communication circuitry (not shown) that provides a wireless connection to the user processor platform. Also, different frequency downconversion techniques would allow the in-phase and quadrature signals to be generated on the channel unit from a single source on the RF circuit which have been partially downconverted.

The tracking information with respect to each satellite is associated with a particular channel. As noted above, in order to maintain a lock on each satellite, the tracking circuitry and processes must be immediately responsive to the incoming satellite data. The tracking is done principally by code delay locked loops (DLLs) and carrier phase lock loops (PLLs). These can be embodied as hardware, software or a combination of both. The DLL and PLL assure that the incoming codes and carrier phases received for each satellite are matched (locked) to the receiver generated codes and phases, and remain locked throughout the tracking of the continuously received signals.

In the GPS system, with respect to each satellite in view, the information to be transmitted by the satellite is modulated by a pseudo-random code to generate a pseudo-random signal that is transmitted by the satellite and received at the receiver. Matching pseudo-random codes are also generated at the receiver by code generators. Correlators, at least one for each channel, are used to match the pseudo-random code received from the satellite with the pseudo-random code generated at the receiver. In a DLL implementation, two correlators are typically used to measure the time shift of the received code with respect to the receiver generated code. A numerically controlled oscillator (code NCO generator) generates the phase and frequency of the receiver codes (e.g., C/A code or P-Code). This signal is selectively delayed to generate three phases of the code: early, punctual and late. The received signal is correlated with all three. The output of the late correlator is subtracted from that of the early correlator, thus forming an error function that is used to drive the code NCO, which advances or retards the code in a manner to lock to the received signal and to track the satellite. These techniques are well-known and well-defined in the GPS literature.

The punctual code corresponds to the phase of the received signal. The correlation between the punctual and incoming codes is used to control the carrier tracking loop and to recover the navigation message transmitted. The carrier PLL functions similarly to the DLL. In particular, a second carrier NCO produces an output signal that drives the receiver frequency so that the sampling frequency to do final mix-down (downconversion) is matched in phase with the receive frequency. A phase comparator generates an output value that is proportional to the difference in phase between the incoming carrier phase and the receiver carrier phase.

As the satellites are tracked, the intermediate measurement data code phase, carrier phase and Doppler is generated and output to the user platform in a non-time critical manner. Code phase data is an average of a snapshot of the data shifted from a time reference to track the incoming code. Doppler data is an average or a snapshot of the carrier NCO required to track the incoming carrier signal. Carrier phase data is an average snapshot of the phase of the carrier NCO or the time delta of the carrier I and Q clock and a time reference. As mentioned above, these snapshots or averages are computed from time critical data, but can be output in a non-time critical manner. The processes that generate the code phase, carrier phase and Doppler data are known to those skilled in the art and will not be described further herein.

Figure 4B:
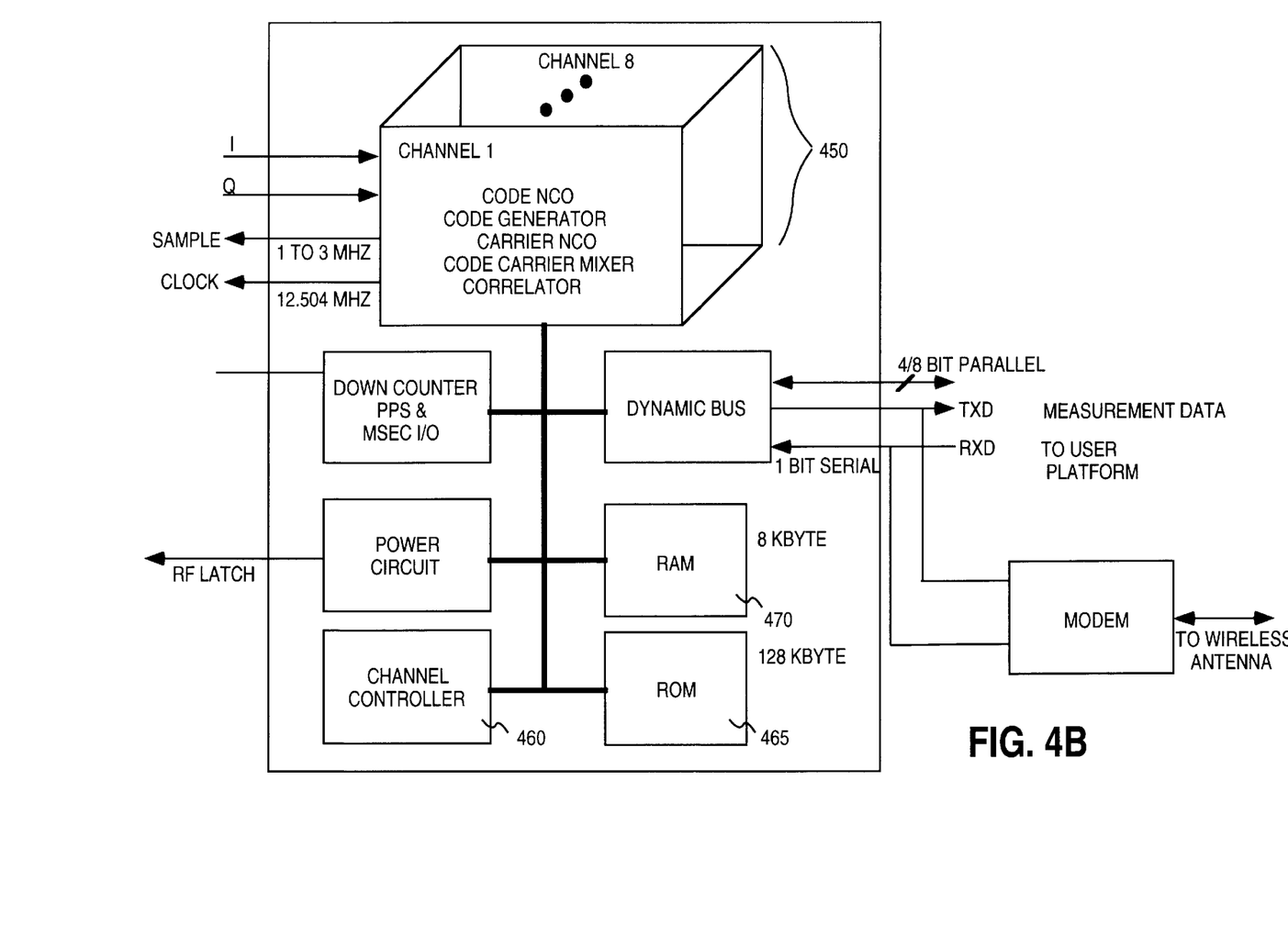
FIG. 4b illustrates one embodiment of a digital signal processor incorporating in the teachings of the present invention.

An illustrative block diagram of the channel unit subsystem is illustrated in FIG. 4b. In this embodiment, the DLLs and PLLs (generally shown as 450) for each channel are digitally implemented and are controlled by the channel unit 460. The channel unit 460 maintains the code NCO phase and carrier NCO phase outputs synchronous with the incoming signals received from the satellites.

Preferably the channel unit 460 is implemented as a microprocessor with sufficient processing bandwidth to execute the locking and tracking and formatting functions. It is contemplated that the channel unit can be implemented alternate ways, including in hardware, wired logic or dedicated microcontrollers or state machines. Also, the number of channels can vary depending on how they are controlled by user platform (e.g., sequenced all on one channel or use dedicated channels).

In one embodiment, the channel unit performs the following functions:

all interrupt driven processing such as processing correlator outputs which recur nominally every millisecond per channel millisecond interrupt processing update of master timers update of carrier phase process input/output messages to provide slew rate control of the satellite searching, acquisition, and also allocation and usage per channel buffer the intermediate measurements of strobe measurements update search for satellites loop closure Preferably each channel is idle until a prepositioning command is received from the user platform and a search for the satellite is started and continued based on the prepositioning information, expanding the search window as needed based on expected signal dynamics. If no prepositioning command is received, the measurement platform will preposition using a prior measurement locally maintained.

The channel unit sub-system further includes memory. In this embodiment, read only memory 465 is used to store instructions executed by the channel unit 460 to perform the locking and tracking functions. Random access memory 470 is also included to temporarily store the intermediate measurement data generated; therefore, there is no time critical requirement to send the data to the user processor platform and intermediate measurement data can be transmitted at a rate slower than the rate generated. Furthermore, by including the memory on the measurement platform and connecting the channel unit directly to the channels there is no need to directly address the multiplicity of GPS channel hardware such as code NCO, carrier NCO and channel correlation circuitry. Furthermore, there is no need to provide for memory addressing to off-platform memory; therefore the pin count of the component is decreased substantially, addressing is simplified and the power consumption is decreased by elimination of a large number of I/O drivers.

A dynamic bus interface 475 is also included. This enables the channel unit subsystem to be configured for a variety of outputs such as a serial connection (e.g., RS-232) and a parallel connection (e.g., RS 422). In addition, it is contemplated that the channel unit subsystem can be coupled to external communication circuitry, such as the wireless communication circuitry 480 shown, to convey the intermediate measurement data across a variety of media and processing platforms. As a straightforward general purpose connection can be configured between the measurement platform and the user platform, extreme flexibility is achieved. For example, as the transmission and reception of data is not time critical and to protect the communication protocol and data contents, the data can be encrypted prior to transmission and/or reception.

As noted above, the measurement platform can communicate with the user platform via a variety of types of connections including well known serial and parallel connections. In the embodiment shown in FIG. 5, the user platform 500 includes a dynamic bus interface 505, microprocessor 510, clock circuitry 515, RAM 520, ROM 525, and UART 530 (universal asynchronous receiver transmitter) also included in the present embodiment 500 is a battery back up controller 535 and a connection to a wireless communication circuit 540.

Figure 5:
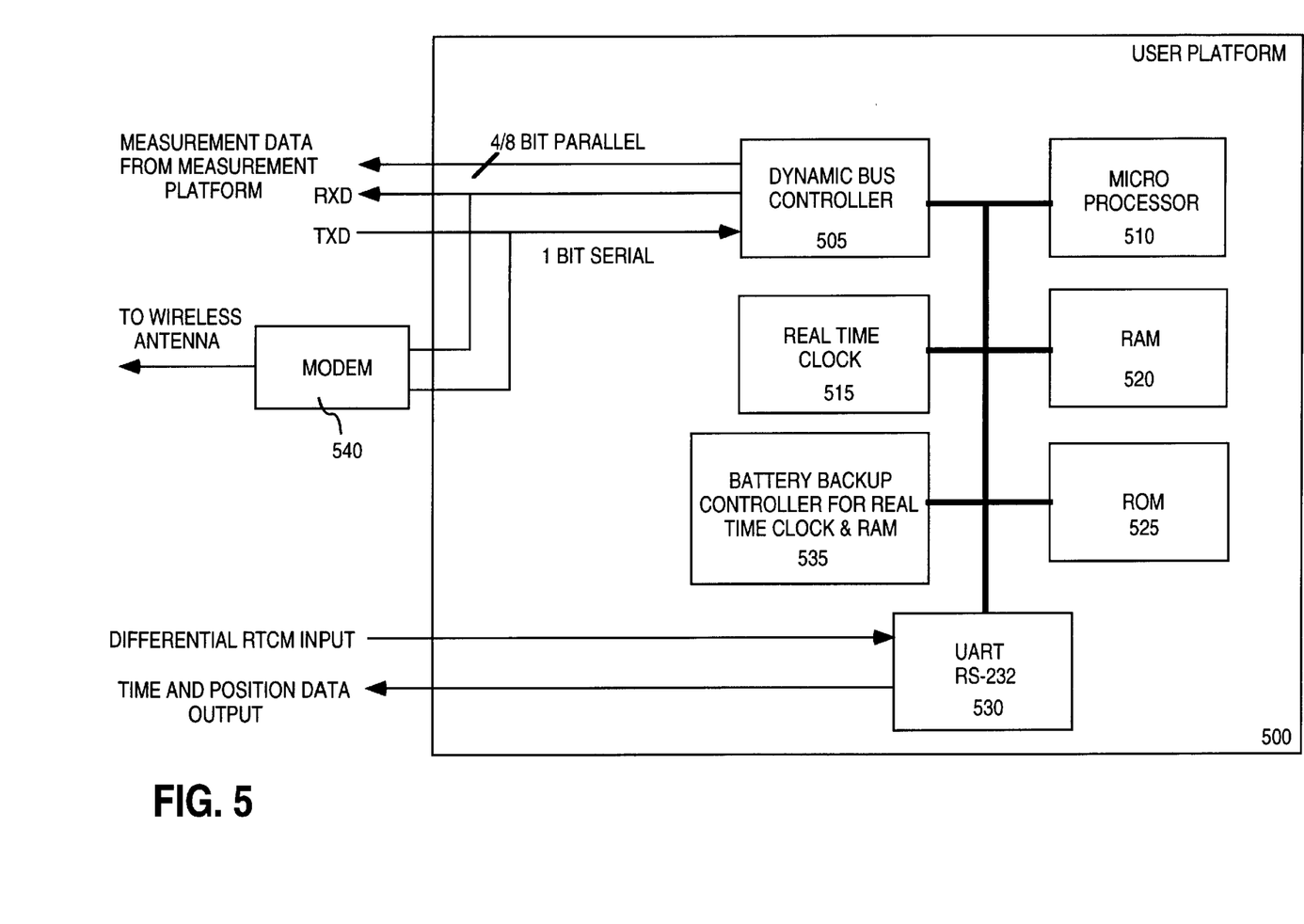
FIG. 5 is a block diagram of the user processing system in one embodiment of the present invention.

The dynamic bus interface 505 interacts with the bus interface on the measurement platform and with UART 530 to receive the intermediate measurement data for additional processing. Preferably the bus interface 505 functions in a bi-directional manner to communicate information back to the measurement platform. For example, in the present embodiment, it is desirable to transmit preposition data to the measurement platform to give the measurement platform same initial information regarding where to look for satellites. This capability is optional and in the absence of such preposition data from the user platform, the measurement platform can use logic to search for satellites in accordance with algorithms provided by GPS specifications.

The microprocessor 510, RAM 520 and ROM 525 can be embodied as a general purpose microprocessor and memory or a specially configured processor system. As the navigation solutions processed are non-time critical, the software developed to execute the processes can be designed more for porting across a variety of hardware and operating system (OS) platforms and not for time critical processing which is typically OS and hardware specific. Thus, it is envisioned that the navigation solution processes are embodied as software routines that are easily ported across a variety of platforms. As the nature of the routines are not time critical, the routines can easily be executed in a multitask environment along with the user's application processes. Furthermore, the user can develop application processes without the need to have intimate knowledge of the GPS-specific processes, as the processes can typically execute concurrently without significant conflict.

The realtime clock is used to establish an estimate of time accurate to a few minutes for selection of "visible" satellites. In addition, it is preferred that the user platform includes a controller 535 to control a battery backup (not shown) in case of loss of power. The UART 530 is preferably configured to communicate to the measurement platform via the dynamic bus 505 and further to communicate with other coupled devices. For example, differential GPS correction data (in the RTCM format) is received via the UART 530 and the UART 530 is used to output information acquired and processed to other devices.

The embodiment of the user platform illustrated in FIG. 5 is exemplary; it is readily apparent that the user platform can be realized a variety of ways. For example, the user platform may be a desktop personal computer system or a single chip system. Alternately, the user platform may be distributed across multiple processors.

Further flexibility and optimization of the measurement platform is achieved by using a toolbox provided to the user platform and a command interface provided on the measurement platform. The toolbox consists of a number of commands that when sent by the user platform to the measurement platform causes the measurement platform to adjust the operation of the measurement platform or provide operation/status data to the user platform. The command interface on the measurement platform interprets the commands received and performs the functions necessary to service the command. Preferably, the command interface is embodied as instructions stored in memory and executed on the measurement platform, e.g., by the channel unit.

Exemplary commands include commands to control the rate data is transferred to the user platform, power control, tracking and acquisition control, preposition control such as location, including the size of search windows, clock control, channel status and diagnostics.

By selectively issuing these commands, low level control can be achieved, e.g., the way the measurement platforms acquisition and tracking, the amount of energy expended by the measurement platform, the type and frequency of data transferred to the user platform can be closely and dynamically controlled in accordance with the performance desired for a particular application. For example, if the user application simply uses a time value received from a GPS satellite, then the appropriate commands are issued to the measurement platform to instruct the measurement platform to acquire and track one satellite and transfer only time information. Other applications, e.g., RTK positioning, may require carrier phase information. In such a situation, the user platform instructs the measurement platform to acquire and track the number of satellites needed to provide accurate carrier phase data (e.g., 4) and transfer the carrier phase data at a rate specified by the user platform.

Figure 6:
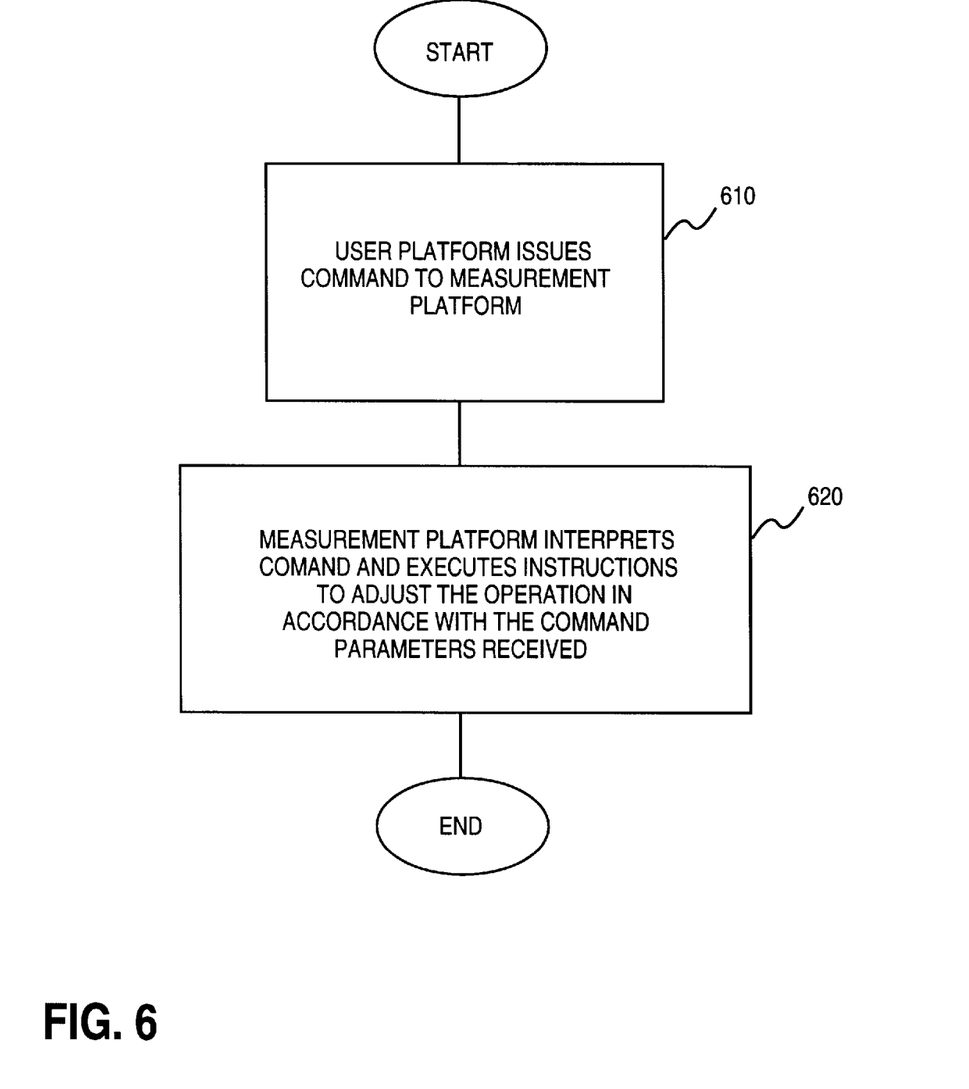
FIG. 6 is a simplified flow diagram illustrating a processor for performing low level control of the channel unit.

Using the low level control provided through the toolbox located on the user platform, the user platform, and therefore the user, can closely control the performance of the measurement platform to customize and optimize performance. The overall process will be described with reference to the flow chart of FIG. 6. The user processor determines the performance required of the measurement platform and sends the appropriate command(s) and parameters to the measurement platform, step 610. The measurement platform, preferably through a command interface, interprets the commands and adjusts its operation in accordance with the command parameters received, step 620. Using the toolbox, the user can control such low level operations as preposition processing, power consumption on the measurement platform and communication parameters.

As noted above a variety of commands that provide low level control of the measurement platform are contemplated. As will be seen, these commands can improve the performance of the measurement platform and the application process by tailoring the operation of the measurement platform specifically to the particular user application. Exemplary commands will now be discussed.

Figure 7A:
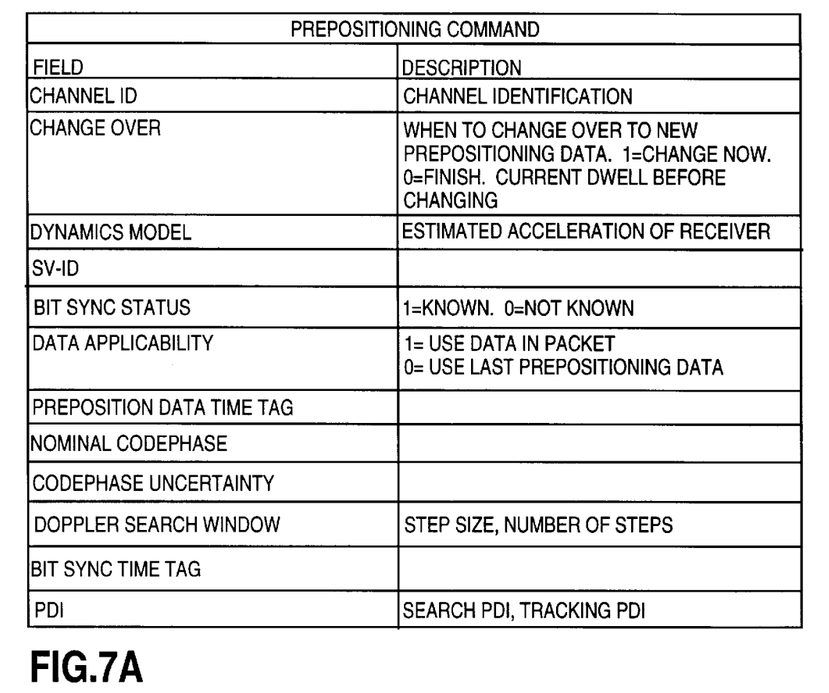
FIGS. 7a, 7b, 7c, 7d, 7e and 7f are further illustrative of some of the commands issued by the user processor to the channel unit in accordance with the teachings of the present invention.

The preposition command enables a user to control the prepositioning of the measurement platform. Sample fields are illustrated in the table of FIG. 7a. The command includes a channel identification to identify the particular channel the preposition command is to be applied to. Also included is a change over bit to indicate when the preposition command is to be applied at the measurement platform. If the change over bit is set, the preposition command is to be immediately applied. If not set, the measurement platform waits for the current dwell before applying the preposition command. The dwell is the measurement size which is sent in a separate packet. The change over bit therefore enables the user platform to develop a sequencing receiver. More particularly, a predictable rotation of satellites can be established using the dwell option.

The acceleration level is used to define an initial search uncertainty (i.e., as time grows, how does window of uncertainty grows according to a dynamics model). The greater the acceleration, the faster the window of uncertainty grows. This enables one preposition command to be sent and the search is automatically adjusted according to the acceleration as applied to a dynamic model.

The SV_ID bits identify the satellite gold code. A value of zero, however, turns off the channel. This is advantageous for implementing a power saving feature. The data applicability bit indicates whether to use the preposition data found in the current packet or use the prior preposition data. The SV_ID and data applicability bits can be used in combination to provide power efficient utilization of the measurement platform. For example, to provide a low power receiver, the user platform sends commands to receive measurement data from a channel. A preposition command with an SV_ID of zero and data applicability of zero is then sent. The preposition command therefore idles the channel and stops the preposition data of the command from writing over the prior preposition data collected. Subsequently, to power up the channel, a preposition command with the SV_ID set to the proper gold code (i.e., non-zero) value and the data applicability to zero is sent. In response, the channel unit brings the channel out of the idle state and reuses the last preposition data so that the channel starts from where it was previously without requiring recomputation of the preposition data of the channel.

The remaining fields set out the preposition data. For example, the data time tag indicates the time of validity of the preposition data. The nominal codephase and uncertainty fields are used to define the center of the codephase and uncertainty window (in number of chips) about the nominal. The nominal Doppler defines the center of the Doppler window the Doppler search number of steps defines the number of steps within the window, and the step size defines the step size of each step. Thus, the total window size can be determined from the number of steps and step size that is set about the nominal.

In addition, a field can be included to provide an indication as to whether to search every one chip or every half chip. The smaller resolution provides a longer, but more sensitive search, whereas the one chip resolution provides a faster albeit less sensitive search.

The Predetection Interval (PDI) fields indicate how many milliseconds of epoch data (output from correlators) are evaluated before determining if there is power (indicate of satellite lock). The larger the number, the more data is used to determine power and the more sensitivity is realized. Every 20 msec the navigation data can change which can cause a phase reversal in the I and Q data and anything more than a 1 msec PDI can cause error. Therefore, to avoid potential problems, the bit synch field can be used to tell the measurement platforms to align to the edge computed on the user platform.

Figure 7B:
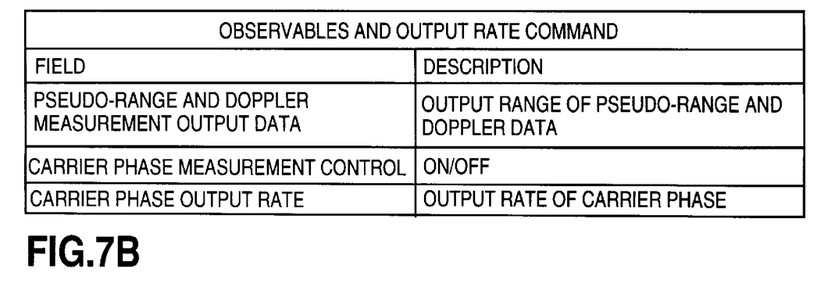

The observables and output rate command, represented by FIG. 7b, controls the rate at which observable data (i.e., pseudo range and Doppler) and carrier phase data are output to the user platform. Thus the rate the carrier phase and the rate the observable data is output can be separately controlled according to the needs of the end user application. In addition to controlling the rate the carrier phase data is output, the output of the carrier phase data can be turned off if not needed; if turned off, the measurement platform does not compute or transmit the carrier phase data, saving some power. The rate at which the observable data is transmitted is separately controlled. When the observable data is not needed, the output can be turned off, reducing the amount of data traffic transmitted from the measurement platform. However, tracking can continue such that when the output is turned on, data is readily available.

The navigation data output control command is used to turn on/off the navigation data. The functionality is generally illustrated with respect to FIG. 7c. The command can be used to control the data on a per channel basis or for all channels. To minimize the processing burden on the measurement platform, the navigation data is not evaluated on the measurement platform and therefore relieves the measurement platform of the computational burden of searching for the preamble and performing parity computations. Thus, all valid data bits are sent to the user platform. In addition, the size and the timing of the start and end points of the data buffers on the measurement platform can be controlled by the user platform. This provides a configurable measurement/user platform interface that enables the measurement platform to work with a variety of user processors and user applications.

Figure 7C:
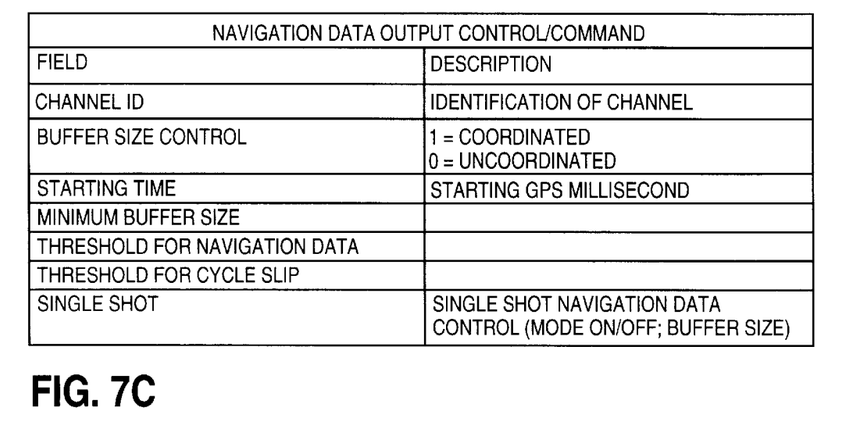

Using this command, the size of the buffer and the phase of output, i.e., coordinated or uncoordinated, is controlled. In particular, in uncoordinated phasing, the data buffer is filled every twenty milliseconds, as soon as valid bits are obtained (i.e., after acquisition). As soon as the specified number of bits are collected to fill the buffer, the bits are sent to the user platform, and the buffer is restarted. The start times of filling the different buffers that correspond to different satellites will therefore depend on when the tracking loop achieves the tracking state at which point the data is considered valid. This therefore produces different (random) phasing of navigation data messages among the different satellites as the satellites are lost and re-acquired. In coordinated phasing, the data buffers are aligned to start from a specified GPS millisecond. After acquisition, the data is buffered. However, as each new bit is added to the buffer, the current GPS millisecond is compared to the starting millisecond specified for a given channel. When equal, the data in the buffer is output and a new group of buffered data is collected.

The starting point of each data buffer can be specified explicitly. If the starting point is the same for all buffers, the data from all buffers will be output concurrently. When dealing with large buffers, it is preferable that the starting points are staggered in order to minimize the burden on the communication channel between the measurement platform and the user platform. The minimum buffer size is also configurable and dictates the minimum amount of data that can be transferred after losing lock.

The command also permits a single shot option to be selected. The single shot option allows the user platform to interrogate a small piece of navigation data just after the channel has reacquired the satellite signal. This useful for quickly qualifying the measurement integrity. When utilized, as soon as the number of bits collected after re-acquisition reaches the single shot buffer size, the data is transmitted regardless of the phase selected. If not utilized, the user platform would have to wait for the buffer data to be collected and sent to the user platform. The single shot option can also be used in applications that do not require the transmitted navigation data (e.g., the user platform may acquire the navigation data from a coupled server). In this situation, the single shot option is used to quickly verify the integrity of the data. Once verified, the user platform can turn off the navigation data, thereby saving on communication bandwidth between the measurement platform and the user processor.

Figure 7D:
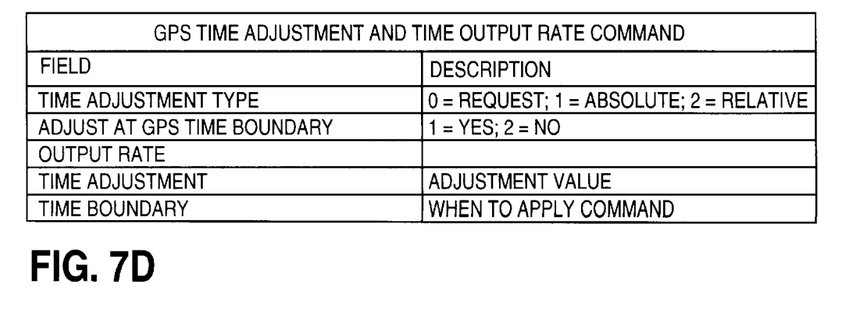

The GPS time adjustment and time output rate command, illustrated by FIG. 7d, enables the user processor to control the clock on the measurement platform and the time output rate when the measurement platform is powered, the time measurement clock is arbitrary, as the time is maintained on the measurement platform. However, when the user platform starts receiving timing information, the user platform can synchronize the measurement platform by setting and adjusting the measurement platform timer and the output rate of the time message.

Figure 7E:
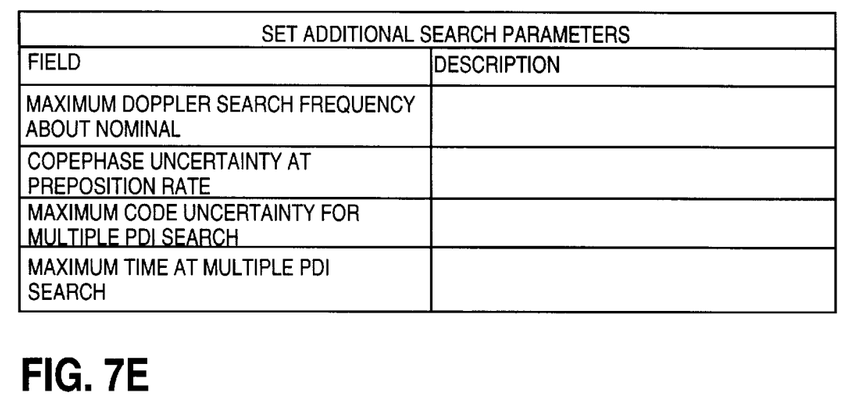

The Set Additional Search Parameters Command, illustrated by FIG. 7e, is used to specify additional parameters of the search algorithms which are not specified in the preposition command. The parameters only need to be sent once per power up cycle to help tune the measurement platform to its particular dynamic environment. The command enables the parameters of the crystal oscillator used to down convert, sample and track the GPS signals to be controlled. These parameters are used to model the maximum frequency uncertainty which must be searched and is needed to bound the Doppler search frequency when prepositioning from measurements or when the prepositioning commands sent from the user platform become out of date. For example, the maximum Doppler search frequency, maximum codephase uncertainty at preposition rate, maximum code uncertainty for multiple PDI search and maximum time at multiple PDI search can be specified to control the search.

Figure 7F:
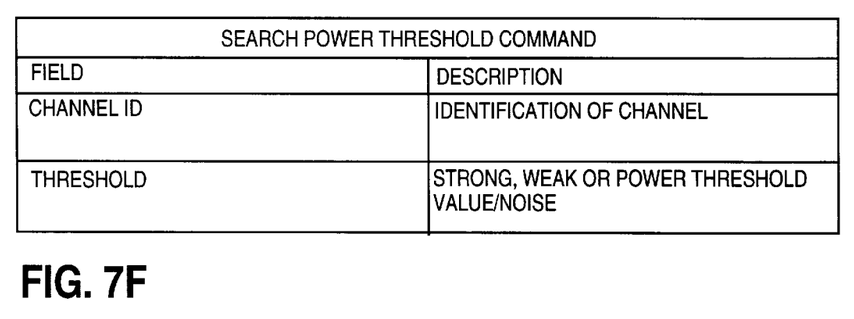

FIG. 7f illustrates the Search Power Threshold command, which, in conjunction with the preposition command and set additional search parameters command controls the search alogorithms for separate channels. The search power identifies signal strength and is typically defined to equal $CNTZ=I^2+Q^2$, where I and Q are the real/imaginary signal portions generated for each channel signal in the channel unit.

In the present example, the command receives an identification of a channel and corresponding power threshold. In one embodiment, the threshold can be specifically identified (e.g., the threshold value is specified). In an alternate embodiment, the user can specify the threshold to be strong, weak or at a noise level. Strong represents a large value; therefore, fewer signals will meet the threshold and therefore be processed. Weak represents a smaller value such that more signals meet the threshold and therefore are processed. The noise threshold represents a small value near a noise level such that most signals are processed.

The exact values are implementation dependent. It should be realized that the stronger or larger the threshold, the fewer signals are typically processed. For example, in situations where historical information regarding satellite positions is assumed to be accurate a low threshold can be used to provide a more sensitive search (as more signals are processed). Where the historical information is not deemed to be reliable, a bigger search area may be warranted, and a strong threshold is desirable to minimize the possibility of the signals.

Other commands also are contemplated. For example, a channel status command enables the user platform to determine the state of the tracking loop of a channel. From the status information, the user platform can determine whether the channel is in tracking state or searching state. The power down control enables the user platform to power down the RF/downconverter circuitry to save power. The clock is maintained in order to gain fast re-acquisition. In addition, it is preferred that a temperature sensor is provided on the measurement platform; therefore the user platform can request the temperature such that adjustments can be made to data based upon temperature. Commands are also provided for the user platform to determine the type of connection (e.g., serial or parallel) and for a serial connection, the baud rate.

Thus, it can be seen that a level of control is provided to the user platform such that the user platform can configure the measurement platform for optimal performance relative to the design goals (e.g., acquisition speed or power reduction).

The invention has been described in conjunction with the preferred embodiment. It is evident that numerous alternatives, modifications, variations and uses will be apparent to those skilled in the art in light of the foregoing description.

What is claimed is:

1. A system for processing navigation information from positioning signals comprising:
   an antenna and downconverter configured to receive positioning signals and generate positioning data for at least one channel;
   a channel unit coupled to the antenna and downconverter, said channel unit configured to receive positioning data from the antenna and downconverter and perform acquisition and tracking calculations to generate data; and
   a user controlled processor sub-system coupled to the channel unit, said sub-system comprising a processor and communication link circuitry, said communication link circuitry configured to receive the data from the channel unit, said processor configured to calculate position and time information using the received data, said processor sub-system further configured to issue commands to the channel unit to perform control of the channel unit, antenna and downconverter, said channel unit is further configured to be responsive to the commands to perform at least one corresponding operation in response to the received command.

2. The system as set forth in claim 1, wherein the command issued by the processor sub-system comprises a power control command signal, the channel unit performing an operation to switch between power on and power down states to reduce power consumption of the channel unit in response to the received power control command signal.

3. The system as set forth in claim 2, wherein the processor sub-system controls the channel unit to switch to the power down state when the processor sub-system does not need the data.

4. The system as set forth in claim 2, wherein the channel unit is the power down state continues to track but does not output the data to the processor sub-system.

5. The system as set forth in claim 2, wherein the channel unit in the power down state stops tracking and outputting the data.

6. The system as set forth in claim 2, wherein the processor sub-system controls the channel unit to switch to the power up state when the processor sub-system needs the data.

7. The system as set forth in claim 2, wherein the processor sub-system controls the channel unit to switch to the power up state when the channel unit is to perform acquisition and tracking.

8. The system as set forth in claim 1, wherein the processor sub-system is configured to issue preposition commands to control the prepositioning of the antenna and downconverter to perform acquisition and tracking.

9. The system as set forth in claim 8, wherein the preposition command sets the size of a search window.

10. The system as set forth in claim 8, wherein the preposition command indicates whether the channel unit is to perform a corresponding operation immediately after receipt of the command or is to wait until a current dwell before performing the corresponding operation.

11. The system as set forth in claim 8, wherein the preposition command indicates an acceleration level that is used to define an initial search uncertainty, the channel unit configured to perform a search that is automatically adjusted according to the acceleration as applied to a dynamic model.

12. The system as set forth in claim 8, wherein the preposition command comprises a bit, which when set to a first state, causes the channel unit to turn off a particular channel.

13. The system as set forth in claim 8, wherein the preposition command comprises a bit that indicates whether to use prior transmitted preposition data or to use preposition data of the preposition command.

14. The system as set forth in claim 1, wherein the processor sub-system is configured to issue output rate commands to control the rate at which data are output to the processor sub-system.

15. The system as set forth in claim 14, wherein the data comprises observable data.

16. The system as set forth in claim 14, wherein the data comprises carrier phase data.

17. The system as set forth in claim 16, wherein the output rate command can indicate to turn off the carrier phase data, wherein the channel unit does not compute the carrier phase, saving power.

18. The system as set forth in claim 17, wherein tracking continues when the carrier phase data is turned off.

19. The system as set forth in claim 15, wherein the data further comprises carrier phase data and the carrier phase data is separately controlled from the observable data.

20. The system as set forth in claim 1, wherein the processor sub-system is configured to issue navigation data commands to control the navigation data output to the processor sub-system.

21. The system as set forth in claim 1, wherein the processor sub-system is configured to issue signal power commands to filter out signals to be processed that do not exceed a threshold.

22. A user controlled receiver sub-system comprising:
a first input coupled to receive positioning data;
a channel unit coupled to the first input, and comprising a first memory configured to store instructions executed by the channel unit and intermediate data generated by said channel unit, said channel unit is configured to receive positioning data and perform acquisition and tracking calculations for at least one channel, said channel unit further configured to compute first data for each channel of an at least one channel acquired and tracked, said channel unit further comprising output circuitry, the first data subsequently output through the output circuitry; and
a second input coupled to receive commands from a user system to control the operation of the channel unit, antenna and downconverter.

23. The system as set forth in claim 22, wherein the first input is coupled to an antenna and downconverter, said commands further to control the operation of the antenna and downconverter.

24. The system as set forth in claim 22, wherein the subsystem further comprises at least one memory configured to store instructions to be executed by the channel unit, said instructions comprising interpretation instructions to interpret the command received and command execution instructions to execute the interpreted command.

25. The system as set forth in claim 24, wherein the at least one memory is further configured to store data generated during performance of acquisition and tracking calculations.

26. The system as set forth in claim 22, wherein the channel unit is configured to receive a power control command, the channel unit performing an operation to switch between channel power on and channel power down states.

27. The system as set forth in claim 26, wherein the channel unit continues to track a channel but does not output first data relative to that channel in response to a channel power down command.

28. The system as set forth in claim 22, wherein the channel unit receives preposition commands.

29. The system as set forth in claim 28, wherein the preposition command sets the size of a search window.

30. The system as set forth in claim 28, wherein the preposition command indicates whether the channel unit is to perform a corresponding operation immediately after receipt of the command or is to wait until a current dwell before performing the corresponding operation.

* * * * *